United States Patent [19]

McDavid, Jr. et al.

[11] Patent Number: 5,579,982
[45] Date of Patent: Dec. 3, 1996

[54] DESOLDERING METHOD AND APPARATUS WITH MINIMUM VACUUM ON-TIME CONTROL

[75] Inventors: Charles H. McDavid, Jr., Baltimore; Marshall Canaday, Odenton; Louis A. Abbagnaro, Silver Spring, all of Md.

[73] Assignee: Pace Incorporated, Laurel, Md.

[21] Appl. No.: 496,884

[22] Filed: Jun. 30, 1995

[51] Int. Cl.[6] .................................................. B23K 1/018
[52] U.S. Cl. ............................ 228/20.5; 219/230; 219/240
[58] Field of Search .......................... 228/20.5; 219/230, 219/240

[56] References Cited

U.S. PATENT DOCUMENTS 3,392,897  7/1968  Siegel ..................................... 228/20.5
4,768,699  9/1988  Abbagnara ............................... 228/102

Primary Examiner—Kenneth J. Ramsey
Attorney, Agent, or Firm—Sixbey Friedman Leedom & Ferguson; Gerald J. Ferguson, Jr.; Evan R. Smith

[57] ABSTRACT

A control circuit for a vacuum desoldering apparatus includes a timing mechanism to ensure that vacuum is maintained for a necessary minimum amount of time, even if a vacuum actuation switch of the desoldering tool is prematurely deactivated by the operator. If the operator presses the vacuum actuator switch for a period of time longer than the predetermined minimum time, vacuum will flow until the switch is released. However, if the operator actuates the switch very briefly, that is, for less than the predetermined minimum vacuum actuation time, the vacuum supply is maintained in an activated state for the predetermined minimum time.

1 Claim, 4 Drawing Sheets

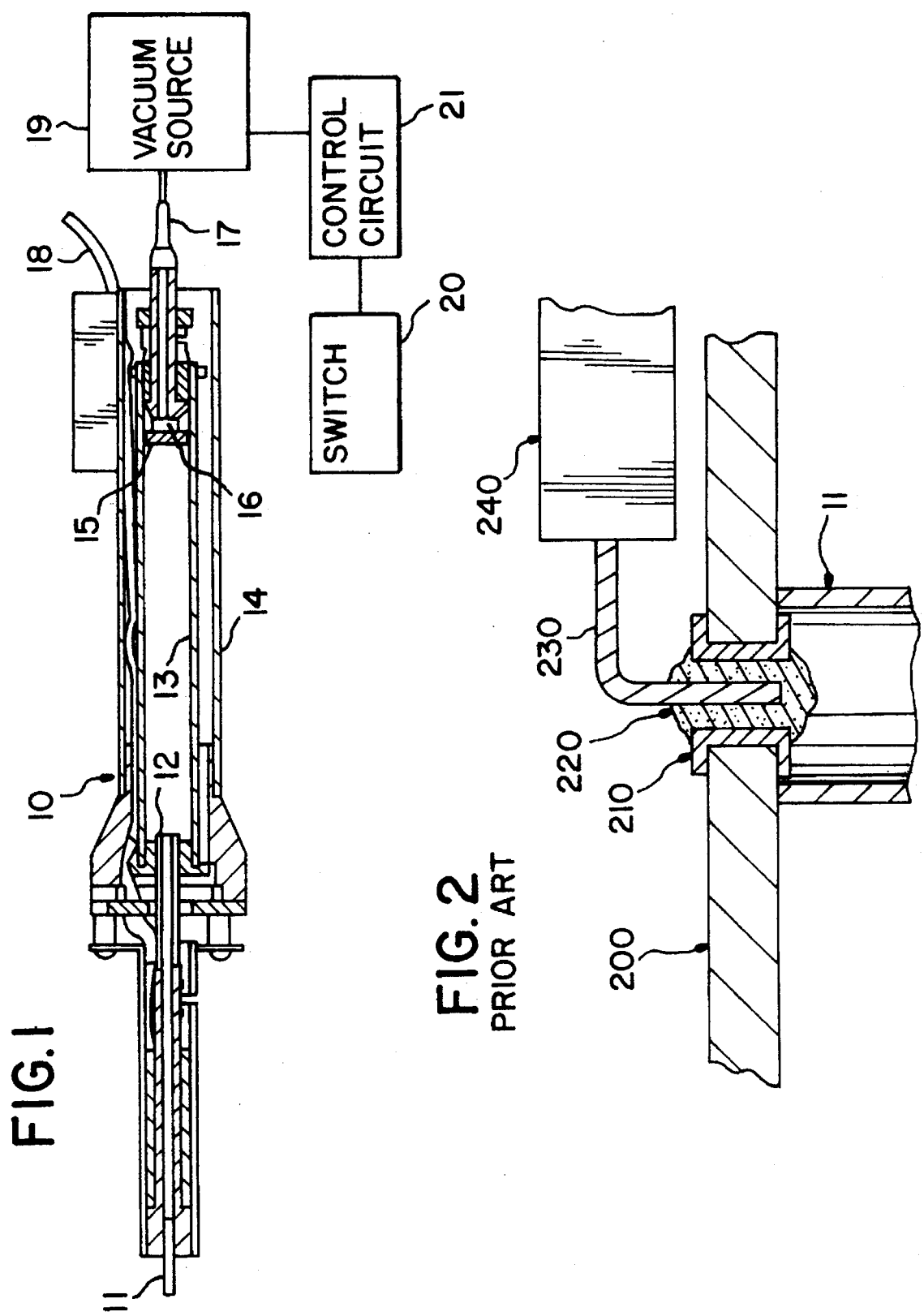

DESOLDERING METHOD AND APPARATUS WITH MINIMUM VACUUM ON-TIME CONTROL

BACKGROUND OF THE INVENTION

1. Field of the Invention

The present invention relates to desoldering methods and apparatus, and particularly to such methods and apparatus by which a vacuum is applied for withdrawal of molten solder in an operator-controlled manner.

2. Background of the Invention

For removal of modular electronic components from a substrate, such as a printed circuit board, heat is supplied via a desoldering tool to melt the solder and vacuum is applied to then remove the molten solder; see, for example, U.S. Pat. Nos. 3,392,897 and 4,768,699.

Typically, vacuum desoldering devices for melting and removing solder from through-hole joints and surface mount lands have simple finger or foot-actuated switches with which the operator can start and stop the flow of desoldering vacuum. In all such devices, the time of vacuum flow is determined by the time during which the switch is actuated.

For complete removal of the solder, and for avoiding the formation of a re-sweat joint in through-hole applications, as well as for preventing clogging of the desoldering tip, heater and solder collection chamber, especially during repetitive production operations in which large amounts of solder are removed, the inventors have discovered that it is necessary that the vacuum flow be present at least for a minimum period of time. However, unskilled operators who try to work too quickly often do not actuate the vacuum flow (via the switch) for a sufficiently long period of time, leading to the above-mentioned problems.

SUMMARY OF THE INVENTION

In view of the foregoing, a primary object of the present invention is to provide a method and apparatus ensuring that vacuum is applied for the necessary minimum amount of time even if the vacuum actuation switch of the desoldering tool is prematurely deactivated by the operator.

In accordance with one preferred embodiment of the present invention, this object is achieved by a latching circuit. Upon mechanical actuation of the vacuum supply of the desoldering tool (either by turning on a vacuum pump or opening a solenoid valve in a vacuum supply line), the reference voltage of an input comparator is changed and until this reference voltage is reset by discharging or charging of a capacitor of a timing comparator, mechanical deactuation of the vacuum supply is ineffective to switch off the vacuum pump or the solenoid valve in the vacuum line.

Mechanical and microprocessor embodiments are also contemplated. In one mechanical embodiment, depressing of an on switch actuating the vacuum pump, or a solenoid valve in a vacuum fine, triggers a timed mechanical latch, so that the depressed switch will not move back to its off position, even if released, until the mechanical latch times out. In a microprocessor version, upon actuation of the on switch, the microprocessor continually polls the switch position and the time elapsed since actuation of the pump. If the switch is detected as being in its off position, the elapsed time is compared with a reference time preset in a look-up table of the microprocessor, and the microprocessor turns off the vacuum pump or solenoid valve in the vacuum line if the elapsed time exceeds the reference time.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a side sectional view of a desoldering apparatus to which the present invention is applicable;

FIG. 2 is a side sectional view illustrating application of the desoldering tip of the apparatus of FIG. 1 to a soldered joint in a printed circuit board, in a manner known in the prior art;

DETAILED DESCRIPTION OF THE PREFERRED EMBODIMENTS

Figure 3:
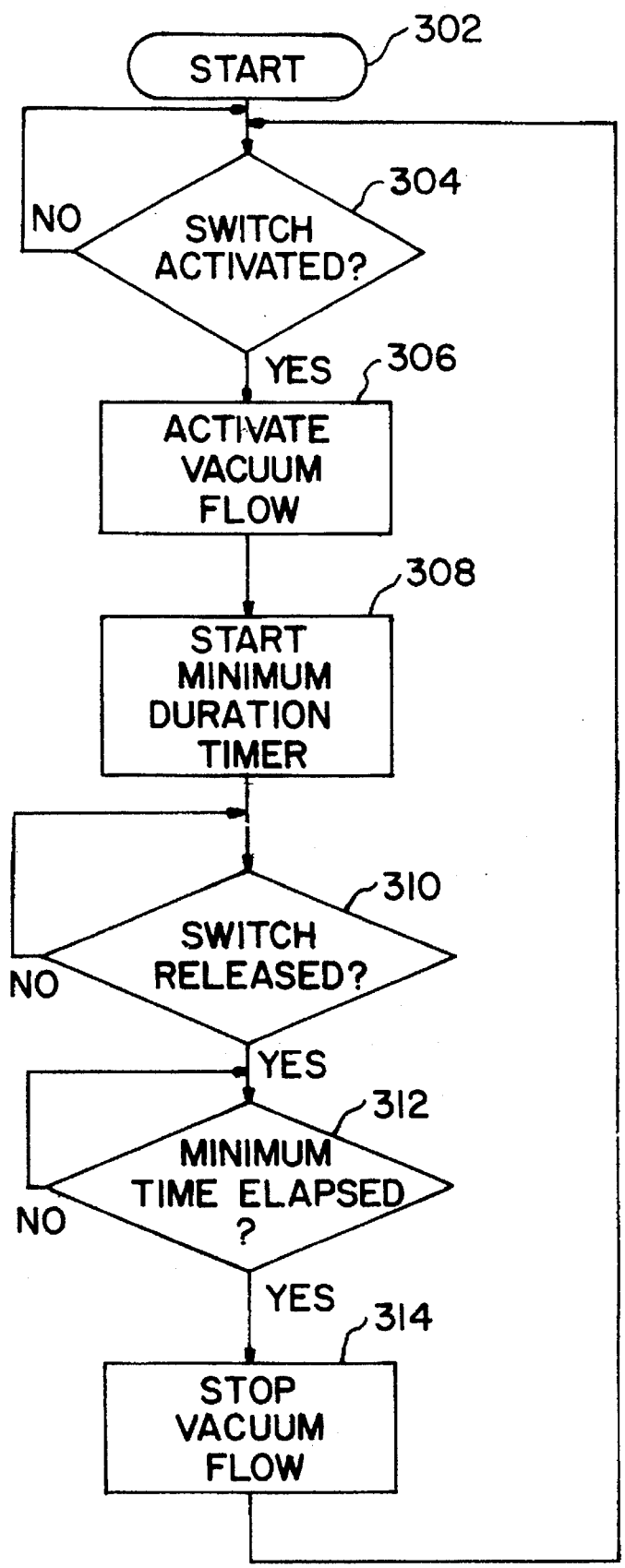
FIG. 3 is a flowchart describing operation of the minimum vacuum on-time control operating feature of the present invention.

The present invention relates generally to a desoldering tool with a vacuum actuator switch, and in particular, to a mechanism for applying vacuum to a joint during a desoldering operation for a minimum time period despite the release of the actuator switch prior to the end of that minimum time period.

For illustrative purposes, a preferred desoldering apparatus will be described briefly herein, although the invention is applicable to vacuum desoldering apparatus of all types. Preferably the vacuum desoldering apparatus is of a type described in U.S. Pat. No. 3,392,897 and U.S. Pat. No. 4,768,699 to Abbagnaro, both assigned to the assignee of this application, the disclosures of which are incorporated herein by reference.

FIG. 1 shows a desoldering system according to the present invention including a desoldering tool 10 (known from U.S. Pat. No. 3,392,897) which is shown herein merely as an example of one type of desoldering apparatus to which the present invention is applicable. As shown in Figure 1, this embodiment of the desoldering system comprises tool 10, tip 11, metal riser tube 12, solder catcher tube 13, handle 14, base 15, conduit 16, vacuum supply tube 17, electrical cord 18, vacuum source 19, vacuum actuator switch 20, and control circuit 21. Desoldering tool 10 can be held in a human operator's hand by grasping of handle 14, and the tool 10 has an electrically heated tip 11 using power supplied by electrical cord 18.

FIG. 2 shows the use of desoldering tool 10 on a printed circuit board 200 having through-hole connector 210, solder 220, lead 230, and circuit element 240. Tip 11 of tool 10 is pressed against a printed circuit board 200 for removal of solder 220 therefrom. In the illustrated example, a through-hole connection is shown between plated through-hole connector 210 and lead 230 of circuit element 240. Upon sufficient application of heat to solder 220 via tip 11, solder 220 begins to melt.

Referring again to FIG. 1, upon observation of solder melting by the human operator, the operator triggers vacuum actuator switch 20. Actuator switch 20 can be any switching means but is preferably a finger or foot operated electrical switch which transmits a control signal to control circuit 21 when actuator switch 20 is activated by the operator. The signal to control circuit 21 provided by actuator switch 20 controls vacuum source 19 to initiate communication of vacuum source 19 with tip 11. Vacuum source 19 may comprise an electric motor and pump for selectively creating vacuum pressure, a switchable connection to a constantly operating vacuum source, or any other appropriate mechanism for selectively providing vacuum to vacuum supply tube 17. Thus, actuator switch 20 can perform its actuating function by turning on a vacuum generating means, such as an electric motor connected to a vacuum pump, or by triggering opening of a solenoid valve controlling communication between a continuously operating vacuum source and a vacuum supply tube 17. As a result of vacuum supplied from vacuum supply tube 17 through a conduit 16 behind a base 15, solder 220 (shown in FIG. 2) is drawn into tip 11, through a metal riser tube 12 into the interior of a solder catcher tube 13.

Vacuum supply may be performed in the quick start pulsed manner described in U.S. Pat. No. 4,768,699, to provide a relatively strong initial vacuum sufficient to dislodge a plug of melted solder and a continued lower level supply of vacuum for cooling the desoldered joint to prevent resweating and reconnection of the desoldered elements due to small amounts of solder which inevitably remain. Other known vacuum supply techniques can also be used with the present invention.

With prior art devices, once the solder was removed from the soldered joint, actuator switch 20 was deactivated by the operator, who then restarted the procedure with another soldered joint, or put tool 10 down between desoldering operations. Thus, in prior art desoldering devices, the time of vacuum flow was determined by the time during which actuator switch 20 was triggered by the operator. In these systems, switch 20 was effectively an on-off switch; when switch 20 was activated, vacuum was applied through tool 10, and when switch 20 was released, vacuum was removed from tool 10.

The inventors have discovered that, for complete removal of solder, avoiding resweating and reconnection of the desoldered elements, and for prevention of clogging of the desoldering tip, heater and collection chamber, especially during repetitive production operations in which large amounts of solder are removed, it is essential that vacuum flow continue for at least a minimum period of time. However, the inventors have also found that unskilled operators, or those operators who try to work too quickly, often do not actuate the vacuum flow (via the switch) for a sufficiently long period of time, resulting in the problems highlighted above. Further, the fact that prior art systems required accurate manual timing of vacuum flow makes these systems more difficult to operate for those persons having certain physical disabilities. The present invention provides a solution to these problems discovered by the inventors and reduces the amount of skill, practice, effort, and physical coordination required to operate vacuum desoldering systems in an optimal fashion.

In this regard, the present invention provides control circuit 21 with means for maintaining a minimum vacuum actuation time, regardless of the actual length of time switch 20 is activated. The inventors have found that a minimum vacuum actuation time of between one second and 1.5 seconds is appropriate for avoiding the potential problems noted above. Although longer times are possible, an excessively long minimum vacuum activation time tends to unduly delay the speed at which the operator proceeds from one desoldering operation to the next. In the preferred embodiment, a minimum vacuum actuation time of 1.25 seconds is established.

Referring now to FIG. 3, the operation of control circuit 21 according to the present invention is described in the form of a flowchart. The operation of the novel vacuum actuation cycle in this invention starts at block 302 when use of the system is started. In block 304, the control circuits determine whether vacuum actuator switch 20 has been activated. If not, control remains in block 304 and the control circuit continues to monitor actuator switch 20. When vacuum actuator switch 20 is actuated, control passes to block 306, and vacuum source 19 is activated to provide vacuum to tool 10. Next, in block 308, a timing mechanism is actuated to measure a predetermined minimum vacuum application time. As noted above, this minimum time will typically be between one and 1.5 seconds, and is preferably about 1.25 seconds. The timing mechanism provides an output signal change when the predetermined time period has elapsed. This change may be a change in voltage or character of a continuous signal, or an output pulse. In addition, the output signal may be a continuous voltage during the operation of the timer which is turned off when the predetermined period has elapsed, or the output signal can be zero volts during operation of the timer and transition to a positive voltage when the predetermined timing period has elapsed. Thus, the timing mechanism design may be varied depending on the control requirements of the control circuit portion receiving the timing signal and controlling the operation of vacuum source 19.

The timing mechanism can be an analog timing circuit or a digital timing circuit or device, and may be implemented in the form of discrete components or using integrated circuits. Also, it should be recognized that the functions of blocks 306 and 308 can be performed simultaneously, or in either order. The length of time required to perform either of these functions is short enough that they will effectively be performed almost simultaneously, even in cases where they are performed sequentially.

Immediately following the starting of the minimum vacuum duration timer in block 308, block 310 is activated and control circuit 21 determines whether actuator switch 20 has been released. If actuator switch 20 has not been released, operation continues in block 310 until the switch is released. When vacuum actuator switch 20 has been released, control passes to block 312 and the control circuits determine whether the predetermined minimum vacuum application time (e.g. 1.25 seconds) has elapsed. If so, control passes to block 314 and vacuum source 19 is deactuated to stop the flow of vacuum to tool 10. If vacuum actuator switch 20 has been released prior to the passage of the minimum vacuum application time according to the minimum duration timer activated in block 308, control remains in block 312 and the operation of block 314 to stop the vacuum flow is postponed until vacuum has been applied for the preset minimum vacuum application time.

Thus, if the operator holds switch 20 in the actuated position for a period of time longer than the predetermined minimum time, vacuum will flow for the length of time switch 20 is actuated, until the switch is released, when vacuum will cease to flow. If the operator actuates switch 20 very briefly, that is, for less than the predetermined minimum vacuum actuation time, vacuum source 19 is activated for the predetermined minimum time rather than for the actual time that switch 20 is activated by the operator.

Upon actuation of vacuum source 19, control circuit 21 preferably provides an increased voltage (e.g. 30 volts) to a vacuum pump drive motor for fast start-up in the manner disclosed in U.S. Pat. No. 4,768,699. This increased voltage persists for approximately 150 ms, and is then replaced by a lower voltage (e.g. +19 volt peak, chopped rectangular waveform regulated to an average value of 12 volts). From the moment of initiation, the operator may immediately release the switch or pedal, however the sequential application of the increased voltage and then the standard run voltage will still occur, with the run voltage held by the control for approximately 1.1 second before stopping, if a 1.25 second minimum vacuum on-time is desired. If the operator elects to continue holding the switch (or pedal), the run voltage will be provided for as long as it is pressed.

Figure 4:
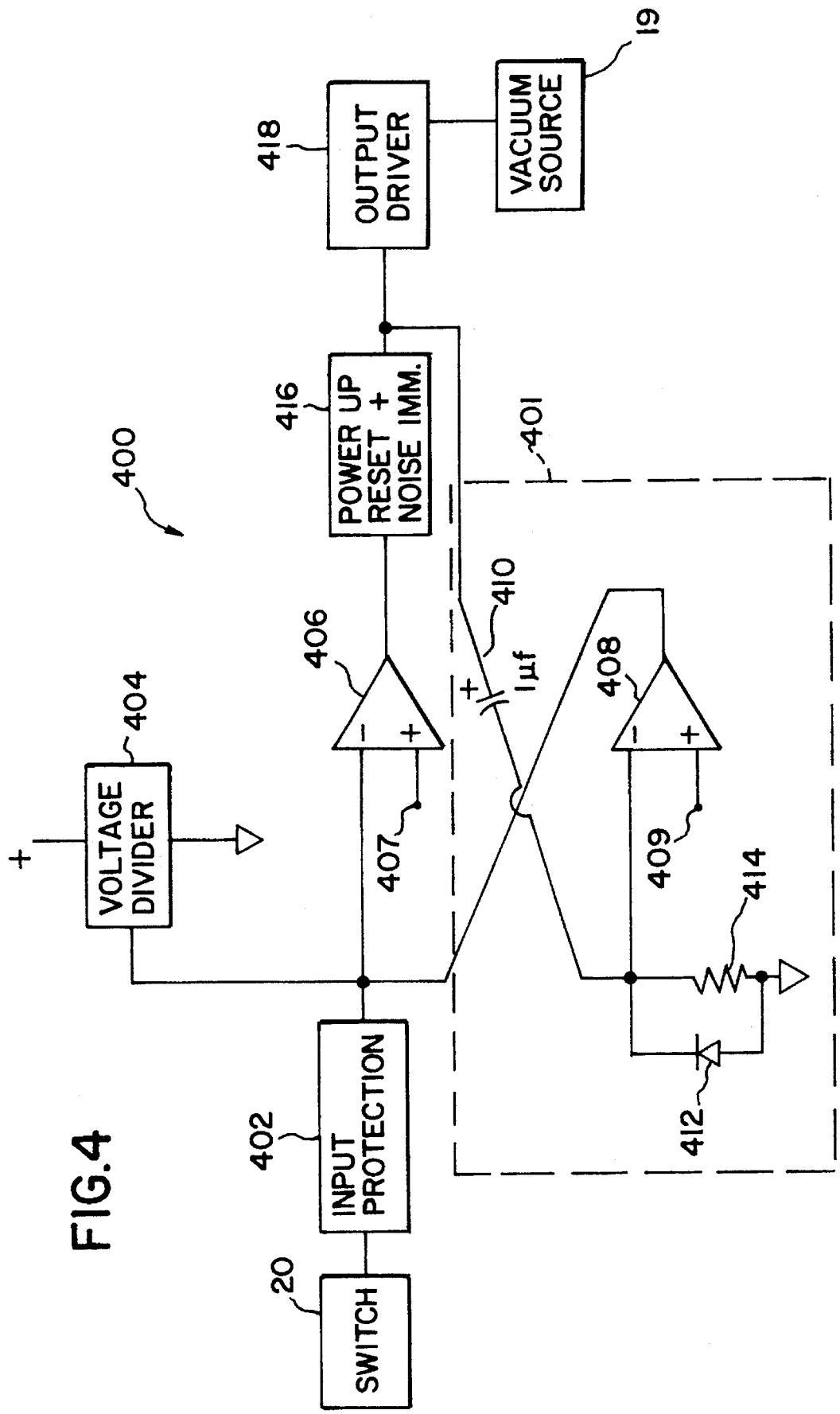
FIG. 4 is a block schematic diagram of an analog implementation of the minimum vacuum on-time control in accordance with the present invention.

FIG. 4 is a block schematic diagram of an analog timing circuit implementing the functions of the invention as disclosed in the flowchart of FIG. 3. The circuit shown in FIG. 4 is a portion of control circuit 21 shown in FIG. 1. In this embodiment, switch 20 is connected to latching circuit 400. Latching circuit 400 comprises input protection circuit 402 which is connected to switch 20, comparator 406, voltage divider 404, one-shot multivibrator 401, and powerup reset circuit 416. The output of input protection circuit 402 is connected to the inverting input of comparator 406. Voltage divider 404 is also connected to the inverting input terminal of comparator 406 to bias comparator 406 so that its output is off when there is no signal from switch 20. A threshold reference voltage (preferably 300 mv) is connected to non-inverting input terminal 407 of comparator 406. The output of comparator 406 is connected to the input of powerup reset circuit 416, and the output of powerup reset circuit 416 is connected to provide an operating control signal to output driver 418. Output driver 418 is connected to vacuum source 19. Output driver 418 is preferably a power transistor circuit which receives a low power control signal from latching circuit 400 and drives a motor or solenoid of vacuum source 19 in response to the control signal.

Input protection circuit 402 includes an input resistor and may also include protective diodes, capacitors, or varistors to provide current limiting and voltage clamping for input protection of latching circuit 400. Comparator 406 debounces switch 20 and generates as its output a control signal which is transmitted through powerup reset circuit 416 to output driver 418. Powerup reset circuit 416 comprises a capacitor connecting the output of comparator 406 to ground, thus tending to hold the output of comparator 406 at ground on powerup, and providing noise immunity.

Comparator 406 is connected so that in a static operating state its output is low, so vacuum source 19 is not activated. When the inverting input of comparator 406 is taken to a voltage near ground, the output of comparator 406 goes high, activating vacuum source 19. Closure of switch 20 applies a very low voltage resulting from the operation of voltage divider 404 of about 107 mVDC to the inverting input of comparator 406. Comparator 406 compares the inverting input terminal voltage against the reference voltage at terminal 407 to detect closure of switch 20. The inverting input of comparator 406 may also be pulled to a low voltage by the operation of multivibrator 401, thus providing a minimum vacuum on-time, in a manner which will now be explained in more detail.

One-shot multivibrator 401 comprises comparator 408, diode 412, resistor 414, and capacitor 410. The output of powerup reset circuit 416 is connected to a positive terminal of capacitor 410, which is preferably a 1 µF electrolytic capacitor. The negative terminal of capacitor 410 is connected to the inverting input of comparator 408, and through resistor 414 to ground. Diode 412 is connected across resistor 414 to establish a desired voltage drop across resistor 414 during activation of vacuum source 19. Resistor 414 is preferably 470 KΩ. The values of resistor 414 and capacitor 410 are determined together because the capacitor charging time established by resistor 414 and capacitor 410 determines the length of a pulse produced by one-shot multivibrator 401. This pulse length is preferably set to the desired minimum vacuum on-time for the system. Non-inverting input 409 of comparator 408 is connected to a reference comparison voltage, preferably about one volt DC. The output of comparator 408 is connected to the inverting input of comparator 406.

Switch 20, when actuated, grounds or nearly grounds the inverting input of comparator 406 so that in conjunction with the +300 mv DC reference input at terminal 407, the output of comparator 406 goes high. The high output of comparator 406 is propagated through powerup reset circuit 416 to output driver 418, activating vacuum source 19 for the duration of activation of switch 20. The positive (high) output signal of powerup reset circuit 416 is fed back into one-shot multivibrator 401.

Comparator 408 of one-shot multivibrator 401 has a one volt signal connected to its non-inverting input 409, and when vacuum source 19 is not activated, has its inverting input pulled to ground. Thus, when vacuum source 19 is not activated, comparator 408 has a high output which does not affect the switching of comparator 406. When vacuum source 19 has been activated and powerup reset circuit 416 has a positive output, a positive voltage is applied to the inverting input of comparator 408 and the output of comparator 408 goes low, pulling the inverting input of comparator 406 low regardless of the condition of switch 20.

At the same time, capacitor 410 begins to charge. As capacitor 410 charges, the voltage at the inverting input of comparator 408 steadily decreases until the voltage drop across resistor 414 is equal to the diode voltage drop of diode 412. Capacitor 410 charges to about 6.3 VDC. When the voltage at the inverting input of comparator 408 again becomes less than the one volt reference at non-inverting input 409, the output of comparator 408 switches from low to high so that this output is no longer pulling the inverting input of comparator 406 low. When the output of comparator 406 transitions low, capacitor 410 is quickly discharged through resistor 414, resetting the capacitor for the next timing cycle.

Thus, multivibrator 401 operates as a latching circuit by holding the inverting input of comparator 406 low for a limited, predetermined period of time after the inverting input of comparator 406 has been made low by the activation of actuator switch 20.

The pulse length of one-shot multivibrator 401 (that is, the time for capacitor 410 to charge and switch the output of comparator 408 back so that the vacuum source is no longer latched on) is set to the desired minimum vacuum on-time, that is, between 1 and 1.5 seconds, most preferably 1.25 seconds.

Figure 5:
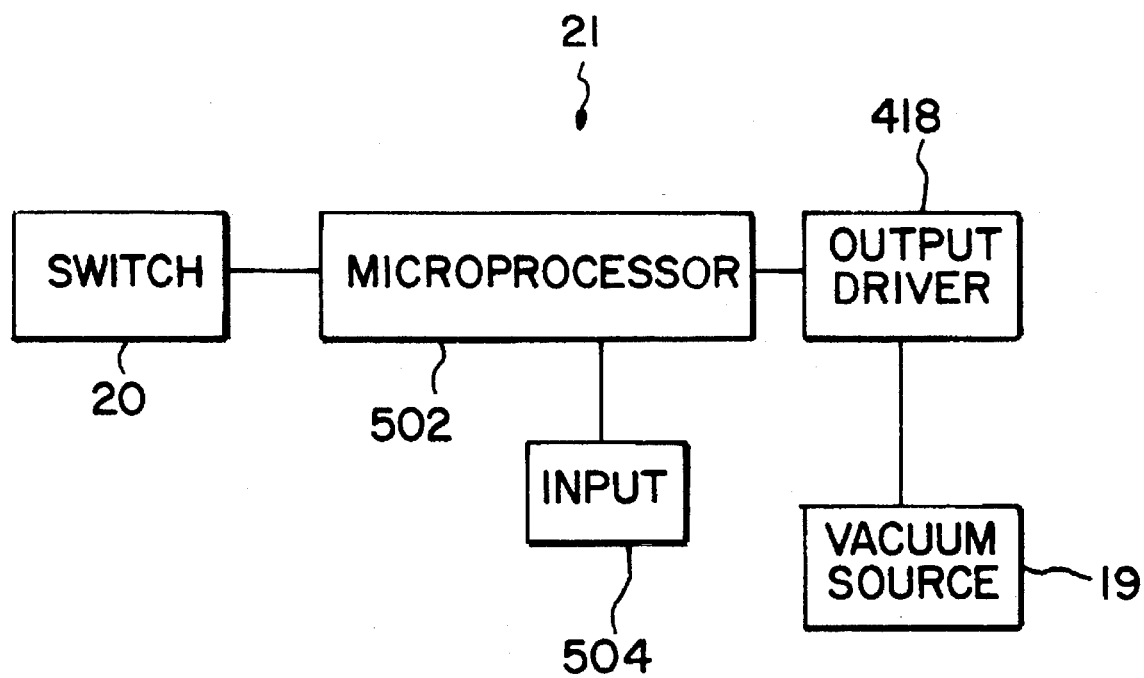
FIG. 5 is a block schematic diagram of a digitally controlled implementation of the minimum vacuum on-time control in accordance with the present invention.

FIG. 5 is a block schematic diagram showing a digitally controlled implementation of control circuit 21. In this embodiment, switch 20 is connected to an input port of microprocessor 502. An output port of microprocessor 502 is connected to output driver 418, which is connected to control vacuum source 19. Microprocessor 502 may be any general purpose microprocessor, microcontroller, or programmable logic array, such as products made by Intel Corporation or Motorola, Inc. Microprocessor 502 preferably incorporates RAM and ROM memory, and has a program which implements the functions of the flowchart of FIG. 3, based on the input sensed from switch 20, and which controls an "on" signal to output driver 418 in accordance with the minimum vacuum on-time function described previously with reference to FIG. 3.

Upon actuation of actuator switch 20, microprocessor 502 continually polls the switch position and counts the time elapsed since actuation of vacuum source 19. If actuator switch 20 is detected as being in its off position, the elapsed time is compared with the minimum vacuum on-time which is preset in the memory of microprocessor 502, and microprocessor 502 turns off the vacuum pump or solenoid valve in the vacuum line if the elapsed time exceeds the minimum on-time. In this embodiment, the minimum vacuum on-time used by microprocessor 502 may be varied under operator control or in response to sensed operating conditions. An input 504 is connected to microprocessor 502 to provide an indication of a desired minimum vacuum on-time. Input 504 may be a switch or series of switches, such as dual-inline-pin switches, that allows binary selection of one of a plurality of predetermined minimum on-times. For example, minimum on-times of 1 second, 1.25 seconds, and 1.5 seconds could be accessed by appropriate manipulation of input 504. A minimum on-time of zero seconds could also be provided as an option, should the operator want to disable the minimum on-time feature. Input 504 could also be a communications bus or port that receives control data from an external microprocessor-based digital control system specifying a minimum on-time to be implemented by microprocessor 502.

In an alternative mechanical embodiment (not shown), mechanical depression of actuator switch 20 triggers a timed mechanical latch, so that the depressed switch will not move back to its off position, even if released, until the mechanical latch times out. The mechanical latch is designed to provide the desired minimum vacuum on-time of one to 1.5 seconds, preferably 1.25 seconds.

In its various embodiments, the present invention provides an improved vacuum flow control operation for a vacuum desoldering apparatus, allowing an operator to more effectively remove solder without the need to precisely coordinate his or her control of the vacuum actuator switch.

We claim:

1. A desoldering apparatus for removal of molten solder from joined parts comprising a desoldering tool, a vacuum supply connected to said desoldering tool for applying vacuum thereto for removing said molten solder, and an operator actuated switch for starting and stopping communication between said vacuum supply and said desoldering tool, and temporary over-ride means for preventing the stopping of communication between said vacuum supply and said desoldering tool by said operator actuated switch until a predetermined time has elapsed from the starting of communication between said vacuum supply and said desoldering tool by said operator actuated switch.

* * * * *